United States Patent [19]

Yuan

[11] Patent Number: 5,769,524
[45] Date of Patent: Jun. 23, 1998

[54] VEHICLE LIGHTING SYSTEMS WITH SIDE LIGHTS

[76] Inventor: Zhiping Yuan, 9817 High Point Dr., Shreveport, La. 71106

[21] Appl. No.: 762,878

[22] Filed: Dec. 12, 1996

[51] Int. Cl.⁶ .............................. B60Q 1/00; B60Q 1/02
[52] U.S. Cl. ............................... 362/61; 362/80; 315/82; 315/83
[58] Field of Search ................................ 362/61, 80, 82, 362/83; 315/82, 83, 64, 68

[56] References Cited

U.S. PATENT DOCUMENTS

| | | | |
|---|---|---|---|
| 2,713,113 | 7/1955 | Snook | 362/82 |
| 3,023,344 | 2/1962 | Owings | 315/83 |
| 3,196,265 | 7/1965 | Schneider | 362/82 |
| 3,435,200 | 3/1969 | Massoll et al. | 362/83 |
| 3,456,153 | 7/1969 | Smith | 362/80 |
| 3,772,527 | 11/1973 | Darling et al. | 307/66 |
| 4,058,720 | 11/1977 | Renfrow | 362/82 |
| 4,337,506 | 6/1982 | Terada | 362/142 |
| 4,755,791 | 7/1988 | Kuroda | 340/115 |
| 4,758,034 | 7/1988 | Ghezzi et al. | 293/132 |
| 4,797,792 | 1/1989 | Oen | 362/83 |
| 4,884,172 | 11/1989 | Walker | 362/61 |
| 4,894,755 | 1/1990 | Chandler | 362/83 |
| 5,067,055 | 11/1991 | Farnsworth | 362/66 |
| 5,150,959 | 9/1992 | Paffrath et al. | 362/80 |
| 5,157,591 | 10/1992 | Chudzik | 362/80 |
| 5,158,350 | 10/1992 | Sato | 362/61 |
| 5,194,779 | 3/1993 | Segoshi et al. | 315/82 |
| 5,215,369 | 6/1993 | Carolfi | 362/83 |
| 5,243,503 | 9/1993 | Hu | 362/82 |
| 5,455,747 | 10/1995 | Aoyama | 362/61 |
| 5,490,051 | 2/1996 | Messana | 362/401 |
| 5,497,304 | 3/1996 | Caine | 362/80 |
| 5,546,284 | 8/1996 | Harada | 362/61 |

*Primary Examiner*—Ira S. Lazarus
*Assistant Examiner*—Nhat-Hang H. Lam

[57] ABSTRACT

A lighting system for a vehicle including a pair of supplemental side lights located adjacent to the front and sides of a vehicle beneath the main headlights thereof, the side lights being angled to project the central rays of their beams outwardly from the central ray of the beams of the main headlights; a parabolic reflector operatively associated with each side light; and a battery with electrical components coupling the main headlights and the side lights, the electrical components including a common single pole single throw-type switch directly coupled with the main headlight and the side lights for ensuring that the side lights are only activated when the headlights are activated, a common single pole triple throw-type turn switch directly coupled to the side lights for indicating a left turn and a right turn by actuating one side light concurrently to the exclusion of the other side light, a single common single pole single throw-type dimmer switch directly coupled to the turn switch for increasing and decreasing the intensity of the main headlights and the side lights concurrently, and a single pole triple throw-type mode switch for allowing the side lights to be operated in a first mode wherein the side lights are actuated by the turn switch, a second mode wherein the side lights are both actuated concurrently independent of the turn switch, and a third mode wherein both side lights are precluded from actuation independent of the remaining electrical components, the electrical components further comprising an emergency light switch adapted to actuate a plurality of conventional emergency lights in addition to allowing automatic actuation of both side lights.

8 Claims, 7 Drawing Sheets

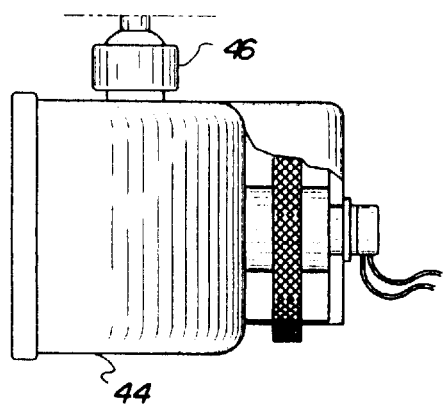
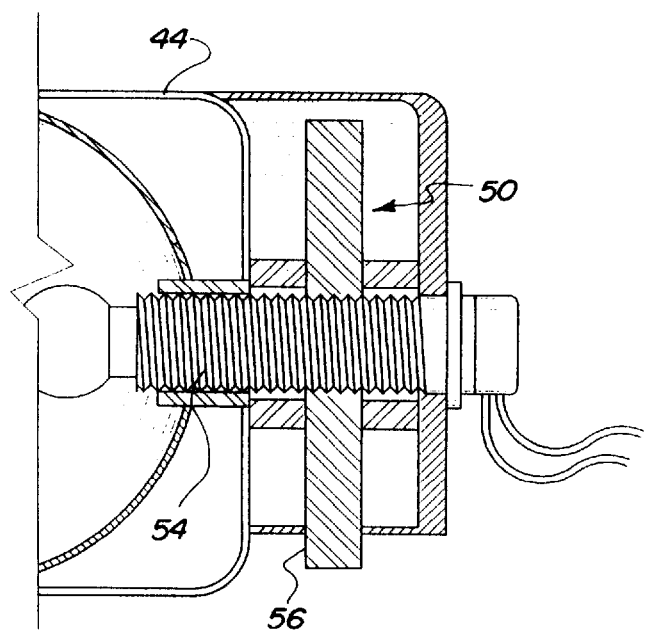

VEHICLE LIGHTING SYSTEMS WITH SIDE LIGHTS

BACKGROUND OF THE INVENTION

1. Field of the Invention

The present invention relates to a vehicle lighting systems with side lights and more particularly pertains to providing a side light system which is controllable so as to allow the convenient use thereof for a plurality of purposes.

2. Description of the Prior Art

The use of vehicle lighting systems is known in the prior art. More specifically, vehicle lighting systems heretofore devised and utilized for the purpose of illuminating areas adjacent to vehicles are known to consist basically of familiar, expected and obvious structural configurations, notwithstanding the myriad of designs encompassed by the crowded prior art which have been developed for the fulfillment of countless objectives and requirements.

The prior art discloses a large number of vehicle lighting systems. By way of example, U.S. Pat. No. 5,150,959 to Paffrath discloses a combination side marker, clearance and reflex clamp for a vehicle.

U.S. Pat. No. 5,157,591 to Chudzik shows attachable auxiliary vehicle lights.

U.S. Pat. No. 4,884,172 to Walker discloses the use of reflectors in a automotive safety device for side lighting.

Lastly, U.S. Pat. No. 5,067,055 to Farnworth discloses an vehicle lighting system section with supplemental lamps operable through complex mechanical and electrical controls for rotational movement with respect to the vehicle with the normal angle typically being in the order of 90 degrees so as to provide good continuous wrap around side lighting.

In this respect, the vehicle lighting systems with side lights according to the present invention substantially departs from the conventional concepts and designs of the prior art, and in so doing provides an apparatus primarily developed for the purpose of providing a side light system which is controllable so as to allow the convenient use thereof for a plurality of purposes.

SUMMARY OF THE INVENTION

In view of the foregoing disadvantages inherent in the known types of headlight systems now present in the prior art, the present invention provides an improved vehicle lighting systems with side lights. As such, the general purpose of the present invention, which will be described subsequently in greater detail, is to provide a new and improved vehicle lighting systems with side lights which has all the advantages of the prior art and none of the disadvantages.

To attain this, the present invention essentially comprises a lighting system for a vehicle of the type having a body with a front end, a rear end and essentially parallel sides therebetween also with a pair of main headlights located at the front end of the vehicle for directing the central rays of its beams in a parallel forward direction, the system including a pair of supplemental side lights located between the front and sides of the vehicle and beneath the main headlights, the side lights being angled to project the central rays of their beams at about 45 degrees, plus or minus ten percent, outwardly from the central rays of the beams of the main headlights; a parabolic reflector operatively associated with each side light; and electrical components coupling the main headlights and the side lights with an external battery through wiring, such electrical components including a common single pole single throw-type switch directly coupled with the main headlight and the side lights for ensuring that the side lights are only activated when the headlights are activated, a common single pole triple throw-type turn switch directly coupled to the side lights for indicating a left turn and a right turn by actuating one side light concurrently to the exclusion of the other side light, a single common single pole single throw-type dimmer switch directly coupled to the turn switch for increasing and decreasing the intensity of the main headlights and the side lights concurrently, and a single pole triple throw-type mode switch for allowing the side lights to be operated in a first mode wherein the side lights are actuated by the turn switch, a second mode wherein the side lights are both actuated concurrently independent of the turn switch, and a third mode wherein both side lights are precluded from actuation independent of the remaining electrical components, the electrical components further comprising an emergency light switch adapted to actuate a plurality of conventional emergency lights in addition to allowing automatic actuation of both side lights.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved vehicle lighting systems with side lights which has all the advantages of the prior art headlight systems and none of the disadvantages.

It is another object of the present invention to provide a new and improved vehicle lighting systems with side lights which may be easily and efficiently manufactured and marketed.

It is a further object of the present invention to provide a new and improved vehicle lighting systems with side lights which is of a durable and reliable construction.

An even further object of the present invention is to provide a new and improved vehicle lighting systems with side lights which is susceptible of a low cost of manufacture with regard to both materials and labor, and which accordingly is then susceptible of low prices of sale to the consuming public, thereby making such vehicle lighting systems with side lights economically available to the buying public.

Still yet another object of the present invention is to provide a new and improved vehicle lighting systems with side lights which provides in the apparatuses and methods of the prior art some of the advantages thereof, while simultaneously overcoming some of the disadvantages normally associated therewith.

Still another object of the present invention is to allow a set of side lights to be employed for inspecting a side walk, street sign or the like at a side of a vehicle.

Yet another object of the present invention is to allow a set of side lights to be employed to inspect an intersecting street while turning.

Another object of the present invention is to allow a set of side lights to be employed to provide additional lighting in emergency situations.

Still yet another object of the present invention is to provide a side light system which is controllable so as to allow the convenient use thereof for a plurality of purposes.

Lastly, it is an object of the present invention to provide a new and improved lighting system for a vehicle including a pair of supplemental side lights located adjacent to the front and sides of a vehicle beneath the main headlights thereof, the side lights being angled to project the central rays of their beams outwardly from the central ray of the beams of the main headlights; a parabolic reflector operatively associated with each side light; and a battery with electrical components coupling the main headlights and the side lights, the electrical components including a common single pole single throw-type switch directly coupled with the main headlight and the side lights for ensuring that the side lights are only activated when the headlights are activated, a common single pole triple throw-type turn switch directly coupled to the side lights for indicating a left turn and a right turn by actuating one side light concurrently to the exclusion of the other side light, a single common single pole single throw-type dimmer switch directly coupled to the turn switch for increasing and decreasing the intensity of the main headlights and the side lights concurrently, and a single pole triple throw-type mode switch for allowing the side lights to be operated in a first mode wherein the side lights are actuated by the turn switch, a second mode wherein the side lights are both actuated concurrently independent of the turn switch, and a third mode wherein both side lights are precluded from actuation independent of the remaining electrical components, the electrical components further comprising an emergency light switch adapted to actuate a plurality of conventional emergency lights in addition to allowing automatic actuation of both side lights.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 4A is a schematic of an electrical system similar to that of FIG. 4 but illustrating an alternate embodiment of the invention.

FIG. 7 is a side elevational view of a lamp similar to that shown in FIG. 6 but constructed in accordance with an alternate embodiment of the invention and with parts broken away to show certain internal constructions thereof.

FIG. 8 is a sectional view taken vertically to the center of the lamp of FIG. 7.

Similar reference characters refer to similar parts throughout the several views of the drawings.

DESCRIPTION OF THE PREFERRED EMBODIMENT

Figure 1:
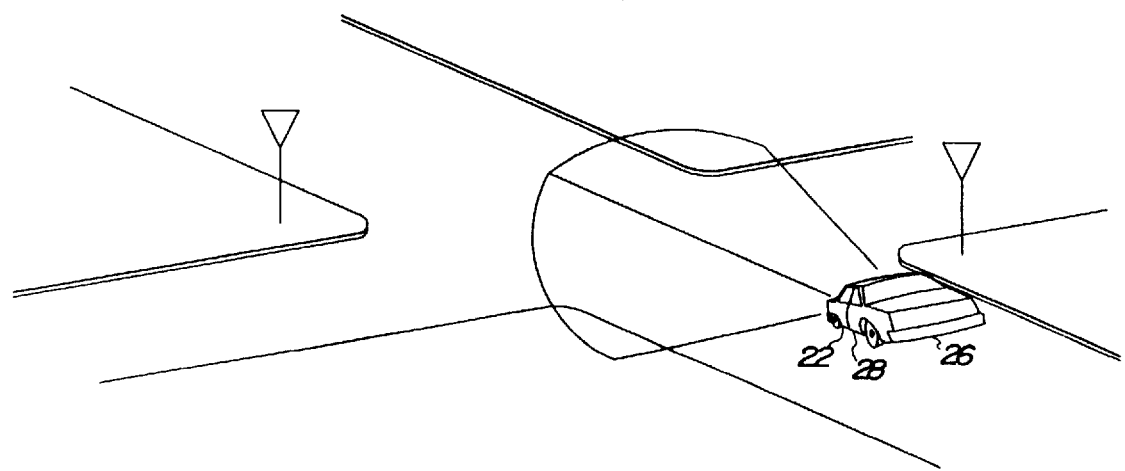
FIG. 1 is a perspective illustration of a vehicle at an intersection, the vehicle employing the preferred embodiment of the vehicle lighting systems with side lights constructed in accordance with the principles of the present invention.
Figure 2:
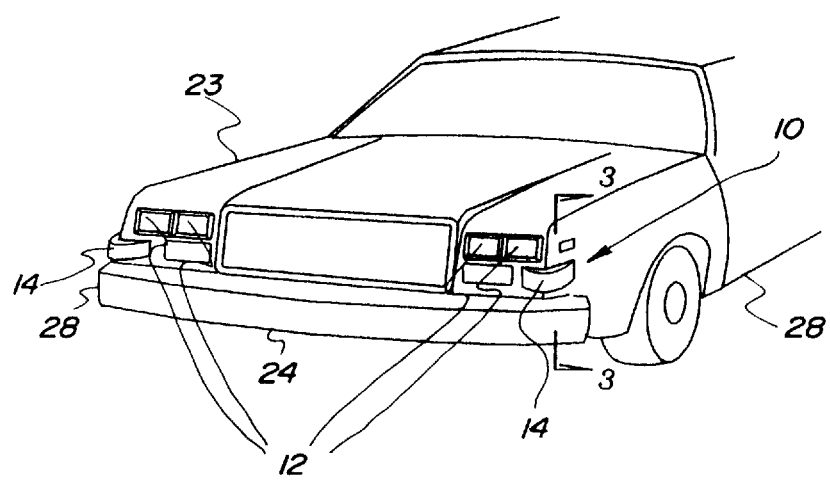
FIG. 2 is a front perspective view of the vehicle as shown in FIG. 1.
Figure 3:
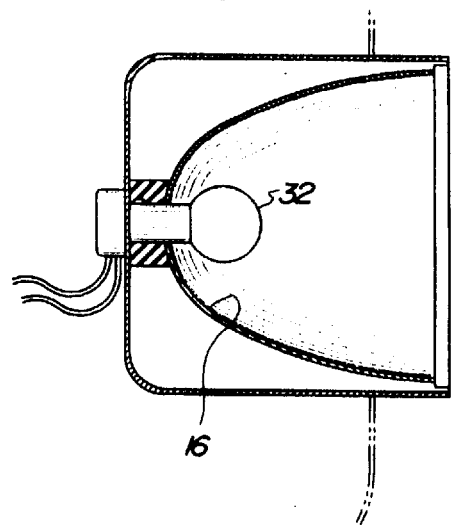
FIG. 3 is an enlarged sectional view taken along line 3—3 of FIG. 2 in accordance with the principles of the present invention and applicable to any of the various embodiments of the invention.
Figure 5:
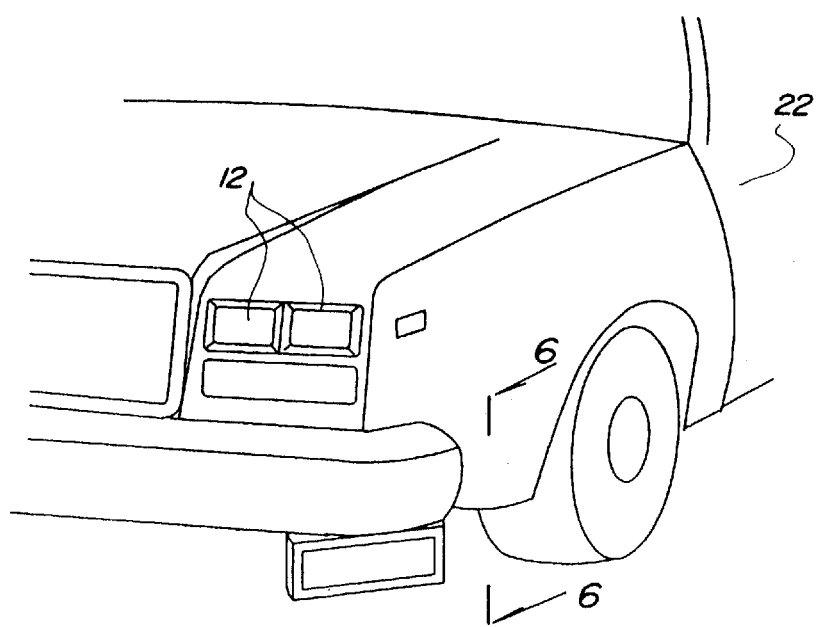
FIG. 5 is a front perspective view of a vehicle with a lighting system constructed in accordance with an alternate embodiment of the invention.
Figure 6:
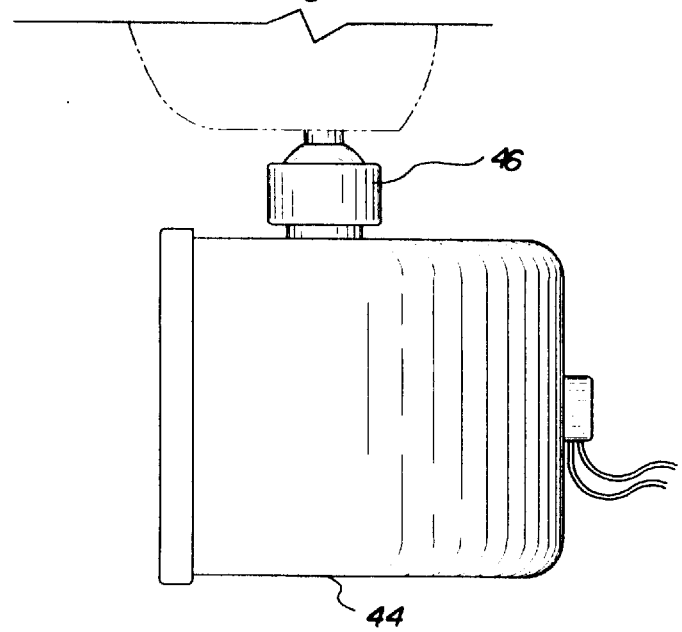
FIG. 6 is an enlarged sectional view taken along line 6—6 of FIG. 5.

With reference now to the drawings, and in particular to FIG. 1 thereof, new and improved vehicle lighting systems with side lights embodying the principles and concepts of the present invention and generally designated by the reference numeral 10 will be described.

More specifically, it will be noted in FIGS. 1 through 4 that there is disclosed of a vehicle lighting system 10 including headlights 12, supplemental side lights 14, reflectors 16, a battery 18 and electrical components 20.

The system 10 is adapted for use on a vehicle 22 of the type having a front end 24, a rear end 26 and essentially parallel sides 28 therebetween. The vehicle 22 also has a pair of headlights 12 located in the front end 24 of the vehicle 22 for directing its beams in a parallel forward direction. Although the vehicle is shown herein as a car, the invention is equally applicable to any and all vehicles, trucks for example.

Figure 9:
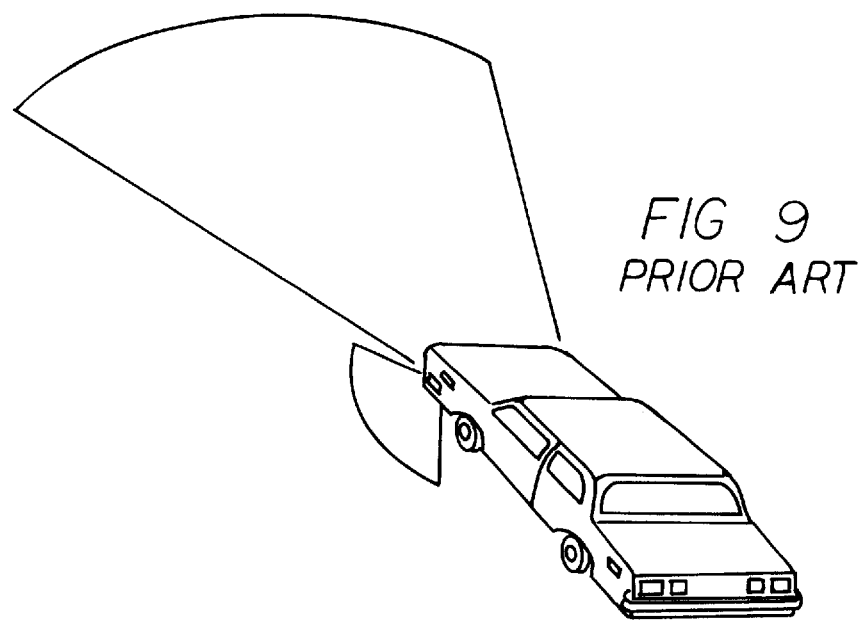
FIG. 9 is a perspective illustration of a prior art side light.
Figure 10:
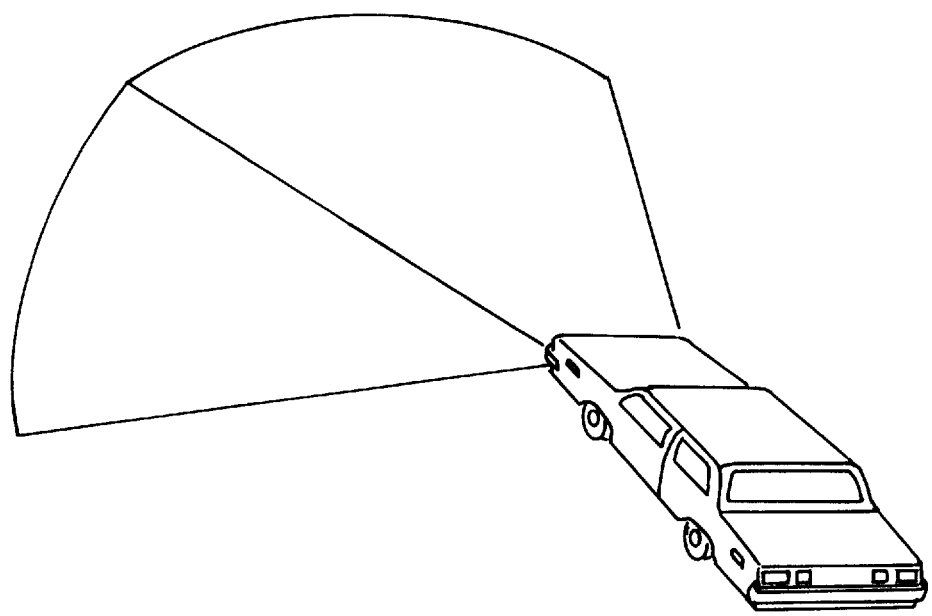
FIG. 10 is a perspective illustration of rays of light produced by the headlight and the side light of the present invention.

A pair of supplemental side lights 14 are provided. Such side lights are located beneath the main headlights. The side lights are angled outwardly to project the central rays' of their beams' at about 45 degrees, plus or minus ten percent, outwardly from the central rays of the beams of the main headlights. Unlike prior art side lights like those shown in FIG. 9, the present headlights are designed to ensure that one edge of the ray is contiguous with one edge of a ray produced by an associated head light. See FIG. 10. By this design, the present side lights expand the actual span both in length and width of the headlights.

Located behind the bulb 32 of each side light is a reflector 16. Such reflector is preferably a parabolic reflector. Its purpose is to direct the light rays of the bulb 32 forwardly for greater efficiency in the use of the generated light.

A battery 18 is provided for electrically powering the lighting system 10, including the headlights 12 and side lights 14. In association with the battery and electrically associated therewith are various electrical components 20. Note FIG. 4. Such electrical components are for coupling the main headlights and side lights.

Figure 4:
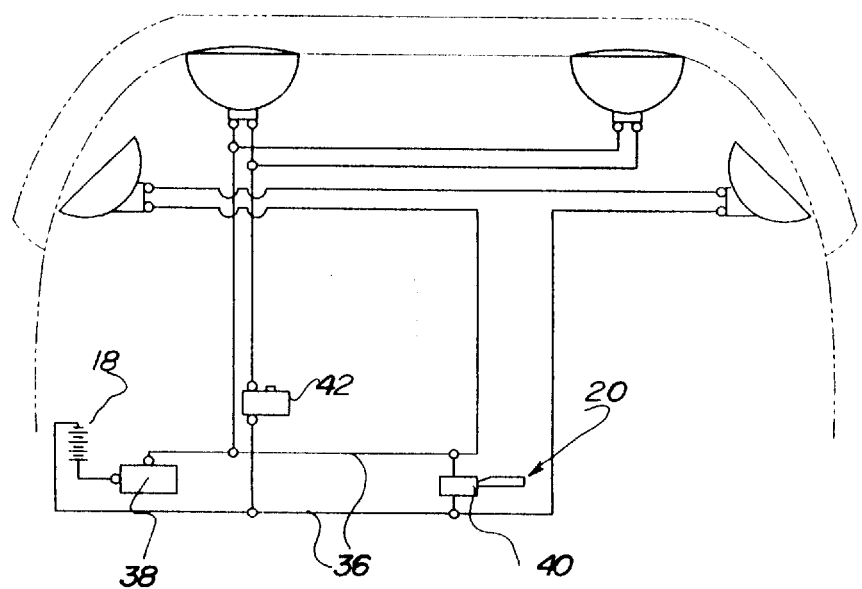
FIG. 4 is a systematic of the electrical system constructed in accordance with the principles of the present invention and applicable to any of the various embodiments of the invention.
Figure 4:
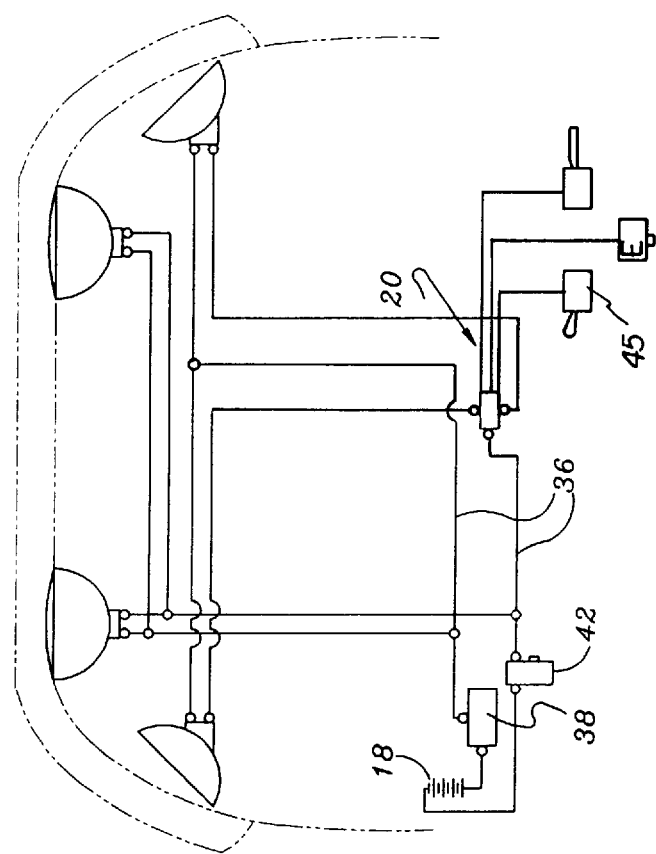

The electrical components 20 include wiring 36 coupling the main headlights and side lights. The electrical components also include a common switch 38 for ensuring that the side lights are only activated when the headlights are activated. A turn switch 40 is also part of the electrical components. Its function is for indicating a left turn and a right turn by actuating an associated side light concurrently to the exclusion of the other side light. Another component of the electrical system is a common dimmer switch 42 for increasing and decreasing the intensity of the headlights and side lights concurrently. With reference to FIG. 4, a single pole triple throw-type mode switch 45 is included for allowing the side lights to be operated in a first mode wherein the side lights are actuated by the turn switch, a second mode wherein the side lights are both actuated concurrently independent of the turn switch, and a third mode wherein both side lights are precluded from actuation independent of the remaining electrical components. Finally, as shown in FIG. 4 without a numeral, the electrical components further comprises an emergency light switch. The light switch is adapted to actuate a plurality of conventional emergency lights in addition to allowing automatic actuation of both side lights.

By the inclusion of the electrical components, the side light system is controllable so as to allow the convenient use thereof for a plurality of purposes. For example, the side lights may be employed for inspecting a side walk, street sign or the like at a side of a vehicle when the side lights are employed in the second mode of operation. Also, the side lights can be employed to inspect an intersecting street while turning in the first mode of operation thereof. In addition, when side lights are not desired, the side lights may be maintained in the third mode of operation. Finally, during emergency situations in which conventional emergency lights of the vehicle are utilized, the side lights are all actuated for additional lighting.

In the preferred embodiment of FIGS. 1 through 4, the supplemental lights are formed integrally in the frame of an vehicle beneath the headlights. Note particularly FIG. 2.

An alternate embodiment of the invention is illustrated in FIG. 4A. In such embodiment, the wiring 36 between the various components including the headlights 12, side lights 14, dimmer switch, etc are modified from the FIG. 4 embodiment. The dimmer switch 42 is electrically coupled to the headlights directly for dimming of the headlights independent of the dimming of the side lights.

In another alternate embodiments of the invention as shown in FIGS. 5 through 8, the side lights 44 are added on beneath the bumper and headlights of the automobile. Note FIGS. 5, 6 and 7. In such alternate embodiments of the invention, the side lights are coupled to the bumper through a universal swivel 46. In this manner, the user may adjust the direction that the main beam of the side lights will be directed.

Figure 11:
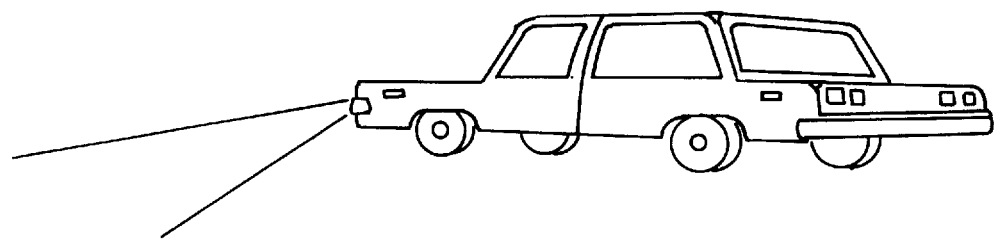
FIG. 11 is a perspective illustration of the rays of light of an alternate embodiment of the present invention as shown in FIGS. 6–8.
Figure 12:
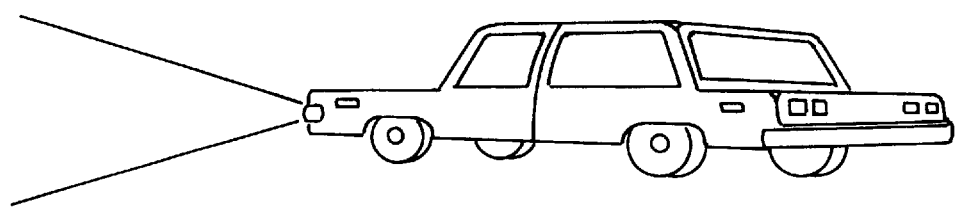
FIG. 12 is another perspective illustration of the rays of light of an alternate embodiment of the present invention as shown in FIGS. 6–8.

The final embodiment of the invention is illustrated in FIGS. 7 and 8. According to such embodiment, there is further included an adjustment mechanism 50. Such mechanism functions to independently move the bulb 32 of each side light 44 forwardly or rearwardly with respect to its reflector 16. This feature is to allow the operator to adjust the focal length of the projected light rays. Adjustment is through a jack screw 54 supporting a bulb 32 for rotational movement. The jack screw serves a dual purpose by further supporting a rotatable nut. The rotatable nut 56 may be rotated by a user. The rotatable nut preferably protrudes slightly from the side lights through a slot formed therein. As such, minimal amounts of dirt and debris enter the side lights. Threads between the screw and nut allow rotation of the nut to linearly move the bulb forwardly and rearwardly with respect to the reflector for focal length adjustment. It should be noted that such mechanical adjustability is critical since it is preferred that the reflecting angle of the side lights be greater than that of the head lights. As shown in FIGS. 11–12, the adjustability of the side lights of the present embodiment allows the side lights to be configured as lower beams or configured as higher beams.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the united states is as follows:

1. A lighting system for a vehicle of the type having a body with a front end, a rear end and essentially parallel sides therebetween also with a pair of main headlights located at the front end of the vehicle for directing the central rays of its beams in a parallel forward direction, the system comprising, in combination:

a pair of supplemental side lights located between the front and sides of the vehicle and beneath the main headlights, the side lights being angled to project the central rays of their beams at about 45 degrees, plus or minus ten percent, outwardly from the central rays of the beams of the main headlights;

a parabolic reflector operatively associated with each side light; and electrical components coupling the main headlights and the side lights with an external battery through wiring, such electrical components including a common single pole single throw-type switch directly coupled with the main headlight and the side lights for ensuring that the side lights are only activated when the headlights are activated, a common single pole triple throw-type turn switch directly coupled to the side lights for indicating a left turn and a right turn by actuating one side light concurrently to the exclusion of the other side light, a single common single pole single throw-type dimmer switch directly coupled to the turn switch for increasing and decreasing the intensity of the main headlights and the side lights concurrently, and a single pole triple throw-type mode switch for allowing the side lights to be operated in a first mode wherein the side lights are actuated by the turn switch, a second mode wherein the side lights are both actuated concurrently independent of the turn switch, and a third mode wherein both side lights are precluded from actuation independent of the remaining electrical components, the electrical components further comprising an emergency light switch adapted to actuate a plurality of conventional emergency lights in addition to allowing automatic actuation of both side lights.

2. A lighting system for a vehicle of the type having a body with a front end, a rear end and essentially parallel sides therebetween, and with a pair of headlights located in the front end of the vehicle for directing the central ray of its beams in a parallel forward direction, the system comprising:

a pair of supplemental side lights located adjacent to the front and sides of the vehicle beneath the main headlights, the side lights being angled to project the central rays of their beams outwardly from the central ray of the beams of the main headlights;

a parabolic reflector operatively associated with each for the side light; and a battery with electrical components coupling the main headlights and the side lights with the battery for concurrent operation, wherein the electrical components include a common dimmer switch for increasing and decreasing the intensity of the headlights and side lights concurrently;

wherein the electrical components include wiring coupling the main headlights and side lights with a common switch for ensuring that the side lights are only activated when the headlights are activated;

wherein the electrical components include a single pole triple throw-type mode switch for allowing the side lights to be operated in a first mode wherein the side lights are actuated by the turn switch, a second mode wherein the side lights are both actuated concurrently independent of the turn switch, and a third mode wherein both side lights are precluded from actuation independent of the remaining electrical components.

3. The system as set forth in claim 2 wherein the electrical components include an emergency light switch adapted to actuate a plurality of conventional emergency lights in addition to allowing automatic actuation of both side lights.

4. The apparatus as set forth in claim 2 wherein the supplemental side lights are formed integrally in the body of an vehicle beneath the headlights.

5. The apparatus as set forth in claim 3 wherein the supplemental side lights are added on beneath the bumper and headlights of the automobile.

6. The apparatus as set forth in claim 2 wherein the side lights are coupled to the bumper through a universal swivel.

7. The apparatus as set forth in claim 2 and further including an adjustment mechanism to move the bulb of each side light forwardly or rearwardly with respect to its reflector to adjust its focal length.

8. A lighting system for a vehicle of the type having a body with a front end, a rear end and essentially parallel sides therebetween, and with a pair of headlights located in the front end of the vehicle for directing the central ray of its beams in a parallel forward direction, the system comprising:

a pair of supplemental side lights located adjacent to the front and sides of the vehicle beneath the main headlights, the side lights being angled to project the central rays of their beams outwardly from the central ray of the beams of the main headlights;

a parabolic reflector operatively associated with each for the side light; and a battery with electrical components coupling the main headlights and the side lights with the battery for concurrent operation, wherein the electrical components include a common turn switch for indicating a left turn and a right turn by actuating an associated side light concurrently to the exclusion of the other side light and a single pole triple throw-type mode switch for allowing the side lights to be operated in a first mode wherein the side lights are actuated by the turn switch, a second mode wherein the side lights are both actuated concurrently independent of the turn switch, and a third mode wherein both side lights are precluded from actuation independent of the remaining electrical components.

* * * * *